3,579,698
TAILGATE WINDOW WASHER
Marcel E. Verdoodt, Warren, and Klaus A. Michalke, Utica, Mich., assignors to Chrysler Corporation, Highland Park, Mich.
Filed Aug. 30, 1968, Ser. No. 756,615
Int. Cl. A47l 1/02
U.S. Cl. 15—250.1                                    8 Claims

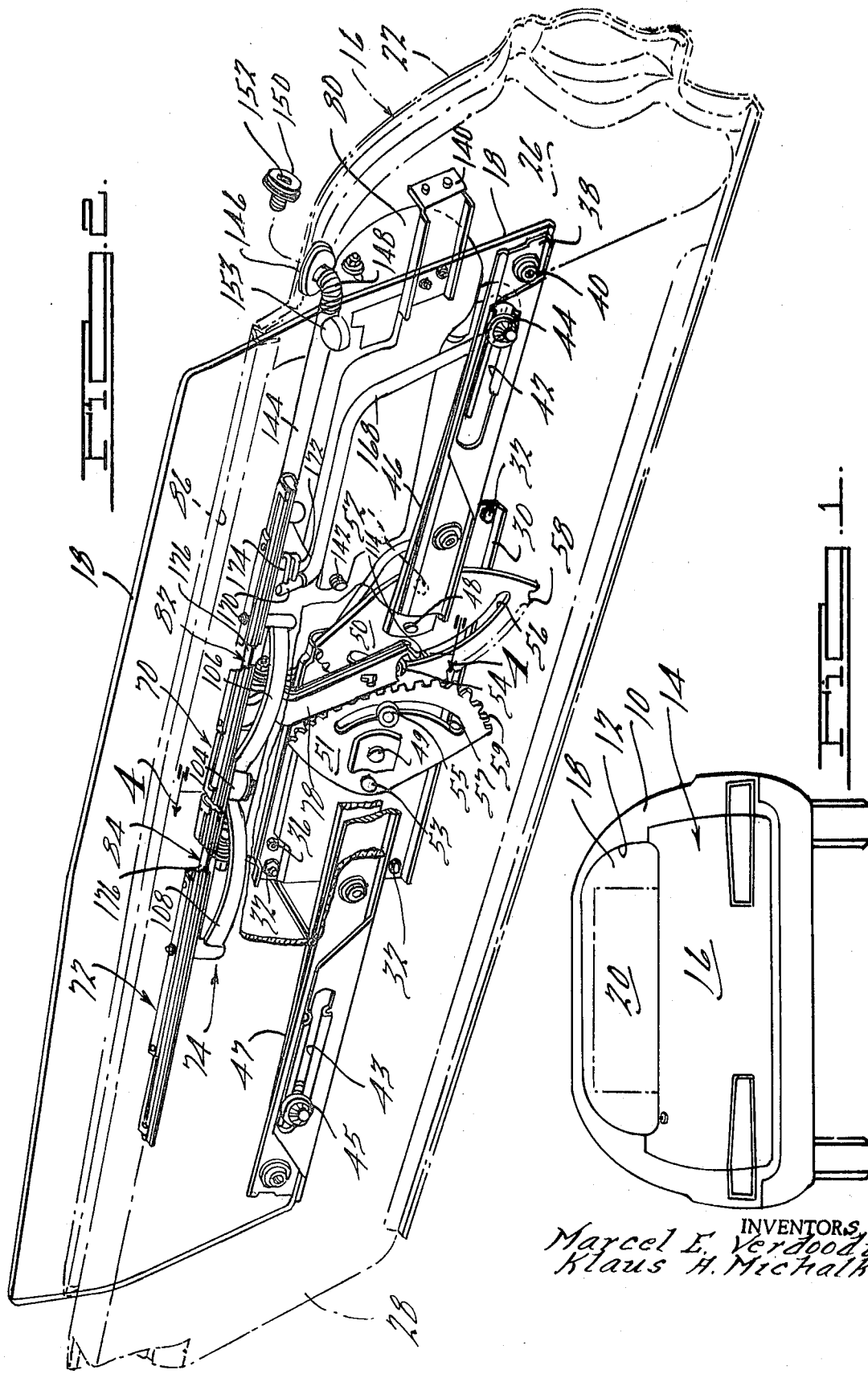

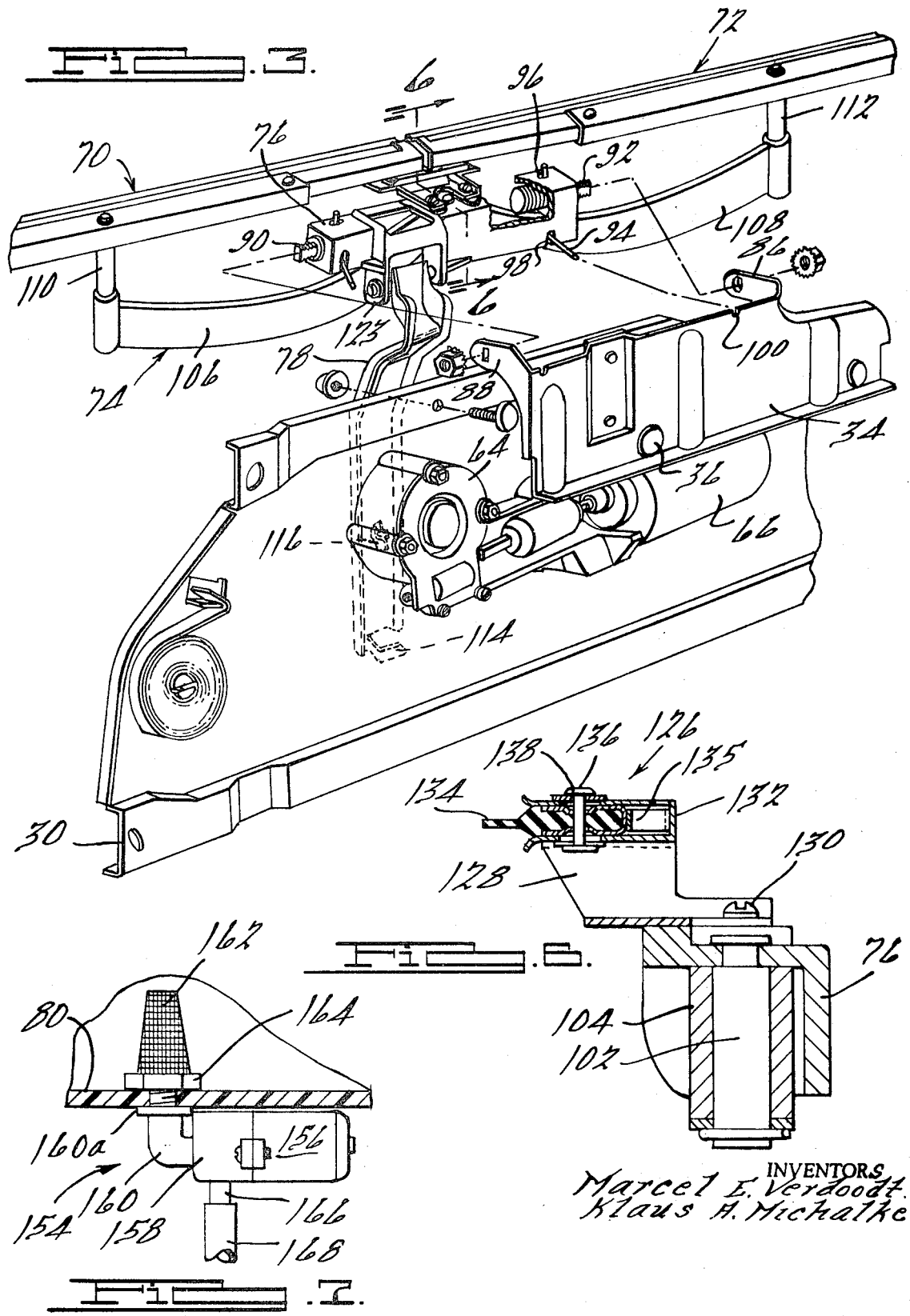

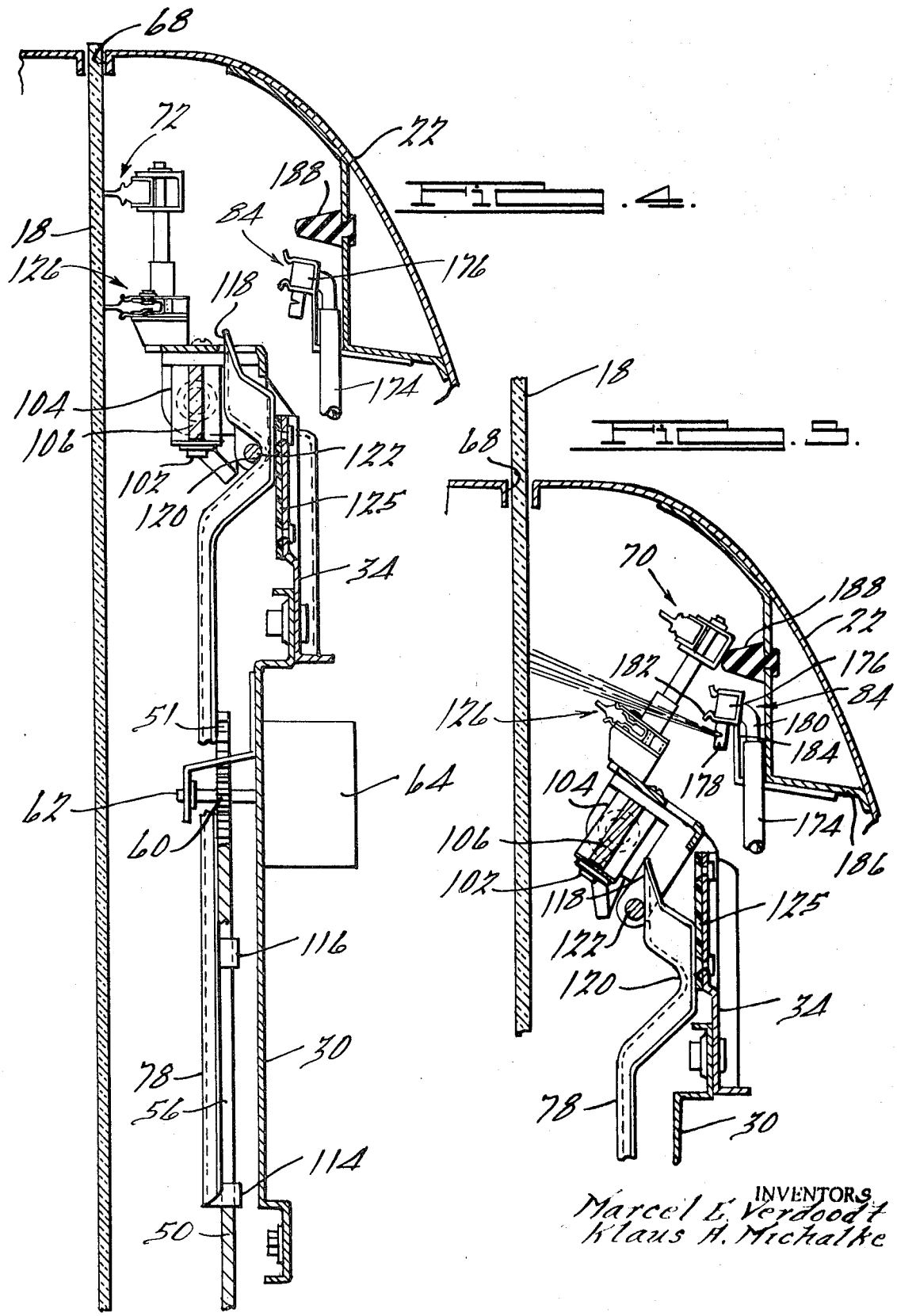

ABSTRACT OF THE DISCLOSURE

A washer mechanism for the window glass of a tailgate of a motor vehicle of the station wagon type in which a pair of wiper blades are mounted within the gate for selective movement between wiping and retracted positions in response to up and down movement of the window glass with a plurality of nozzles, supplied by a reservoir and pump assembly positioned within the gate, positioned directly below the wipers to selectively direct cleaning fluid against the window glass to facilitate the wiping operation. The wipers, in their wiping position, remain stationary and the glass is moved past the wipers to accomplish the wiping and washing action.

BACKGROUND OF INVENTION

The window glass in a tailgate of a motor vehicle of the station wagon type has long plagued motorists by its propensity to collect dirt—with the result that the typical visibility through a tailgate window is at best restricted and oftentimes virtually nonexistent. Various attempts have been made in the past to prevent the accumulation of dirt on the glass. These preventative attempts have included roof mounted air deflectors designed to direct a stream of air downwardly over the window to "blow" the window clean, side mounted deflectors designed to direct opposed streams of air across the window to prevent the accumulation of dirt, and various attempts to configure the adjacent sheet metal of the station wagon body to eliminate or decrease the typical vacuum condition at the rear of the vehicle that is largely responsible for the dirtying propensity of the glass. While these preventative attempts have not been without some success, they have not completely eliminated the dirtying propensity of the glass. Some attempts have also been made to provide means to remove moisture or dirt from the window glass as or after it has accumulated but these attempts, such, for example, as the provision of a standard arcuate sweep type wiper mechanism at the rear of the vehicle, have been generally ineffective to maintain the window clean.

SUMMARY OF THE INVENTION

It is a primary object of the present invention to provide an improved mechanism for keeping the window glass of the tailgate of a station wagon clean.

A more specific object is to provide a washer mechanism for a tailgate window which is effective to remove even heavy or encrusted dirt from the window, whereby to enable the operator of the vehicle to maintain clear visibility through the tailgate window under any and all operating conditions.

The tailgate washer of the invention includes at least one wiper blade which is mounted within the gate structure for movement between a working position in wiping contact with the window glass and a retracted position withdrawn from the path of the glass; the wiper blade is selectively moved between these positions in response to, and in synchronism with, the raising and lowering movement of the window. The invention washer further includes a plurality of nozzles which are mounted within the tailgate in transversely spaced positions and which are supplied with cleaning fluid from a reservoir and pump assembly positioned within the gate structure. The nozzles are positioned to direct cleaning fluid onto the window glass immediately below the area of contact of the wiper blade with the glass so that as the window is thereafter moved upwardly past the wiper blade the blade effectively removes the moistened dirt from the glass. According to a further feature of the invention, the wiper blade is moved automatically to its working position in response to movement of the glass to its lowered position. Thus, with the glass in its lowered position, the driver may actuate the washer pump assembly to direct cleaning fluid onto the glass below the readied wiper blade and thereafter raise the window to move the glass upwardly past the wiper blade to wash the window with a wiping or "squeegee" action.

These and other objects, features and advantages of the invention will be apparent from the following detailed description of a preferred embodiment.

BRIEF DESCRIPTION OF THE DRAWINGS

A preferred embodiment of the invention is illustrated in the accompanying drawings in which:

FIG. 1 is a rear view of a motor vehicle of the multipurpose or station wagon type showing the effective washing area of the window washer of the invention;

FIG. 2 is a fragmentary perspective view of the tailgate of the motor vehicle of FIG. 1 looking generally rearwardly from inside the vehicle;

FIG. 3 is a fragmentary perspective view of the tailgate of FIG. 2 looking generally forwardly from behind the vehicle and with the tailgate outer structure removed;

FIG. 4 is a cross sectional view taken on line 4—4 of FIG. 2, showing the wipers in working position;

FIG. 5 is a view similar to FIG. 4, showing the wipers in retracted position;

FIG. 6 is a cross sectional view taken on line 6—6 of FIG. 3; and

FIG. 7 is a fragmentary view of a pump assembly for use with the invention.

DESCRIPTION OF THE PREFERRED EMBODIMENT

The station wagon of FIG. 1 includes a main body structure 10 defining a rearward opening 12, and a tailgate assembly 14 adapted to selectively close opening 12. Tailgate assembly 14 includes a gate 16 pivotally mounted in known manner on body structure 10 and a window glass 18 carried by gate 16 and adapted to be raised and lowered in known manner. Glass 18 is shown in raised position in FIG. 1 and the area which is washed by the washer of the invention is indicated at 20.

Referring now particularly to FIG. 2, gate 16 is shown therein in phantom and includes an outer skin 22, an inner skin 24 and end walls 26 and 28. Walls 22, 24, 26, and 28 together define a hollow, box-like structure into which glass 18 is lowered to assume its stowed position and in which the window raising mechanism, as well as the window washing mechanism of the invention, is housed. The window raising mechanism and the window washing mechanism are mounted within the tailgate by a mounting plate 30 secured by bolts 32 to the adjacent tailgate structure. Mounting plate 30 is generally vertically oriented within the tailgate and has a mounting bracket 34 secured to its upper edge by bolts 36 (see also FIG. 3).

The window raising mechanism is generally conventional and includes a bracket 38 secured by bolts 40 to the lower edge of glass 18 and defining tracks 42, 43 at either side of the glass, and rollers 44, 45 guided in tracks 42, 43 and carried on the free ends of drive links 46, 47 secured at their inner ends by pins 48, 49 to intermeshing gear quadrants 50, 51. Quadrants 50, 51 are pivotally mounted to mounting plate 30 by pins 52, 53 and are guided by pins 54, 55 mounted on plate 30 and slidably received in arcuate slots 56, 57 concentric with the arcuate gear faces 58, 59.

As best seen in FIGS. 3 and 4, quadrants 50, 51 are driven in known manner by a pinion 60 on the output shaft 62 of a gear box 64 secured to the rear face of plate 30. Pinion 60 meshes with teeth 59 on quadrant 51. Gear box 64 is driven by electric motor 66 secured to the rear face of plate 30. It will be understood that motor 66 may be selectively actuated in known manner by the driver of the vehicle. When the motor is operated in one sense, quadrants 50 and 51 pivot downwardly about their pivot axes to raise drive links 46, 47 and thereby raise window glass 18. When the motor is operated in the opposite sense, quadrants 50, 51 are pivoted upwardly to lower arms 46, 47 and lower window glass 18. During these operations, pins 54, 55 guide in slots 56, 57 to stabilize the movement of the quadrants and window glass 18 passes through and is guided by a slot 68 defined between the upper in-turned edges of outer skin 22 and inner skin 24.

The window washer of the invention is operative to selectively wipe and/or wash window glass 18 during selected portions of its up and down movement. The window washer, is best seen in FIG. 2, includes a pair of wipers 70, 72, a yoke 74, a carrier member 76, and actuator arm 78, a reservoir 80 and a pair of nozzle assemblies 82, 84.

Carrier 76 (FIGS. 3, 4, 5) is generally L-shaped in cross section and is pivotally mounted between ears 86, 88 of bracket 34 by bolts 90, 92 passing through aligned apertures in ears 86, 88 and in the respective ends of carrier 76. A torsion spring 94 is wrapped around the inboard shank portion of each bolt. One end of each spring 94 passes through a slot 96 in the overlying horizontal web portion of carrier member 76 and the other end of each spring passes through a slot 98 in the vertical web portion of the carrier and is received at its free end in a notch 100 formed in the upper edge of bracket 34. Clock springs 94 thus continuously bias carrier 76 for movement in a counterclockwise direction as viewed in FIGS. 4 and 5. A pin 102 (see also FIG. 6) is secured to the approximate mid-point of carrier 76 and depends downwardly therefrom. Pin 102 rotatably receives the enlarged central hub portion 104 of yoke 74. Yoke 74 further includes arms 106 and 108 which extend from the opposite sides of hub 104 and carry upstanding pins 110, 112 at their free ends. Wipers 70, 72 are received with a snap fit on pins 110, 112 to thereby mount the wipers on yoke 74. Springs 94 thus act to continuously urge wipers 70, 72 in a direction toward window glass 18. Pins 110, 112 allow the wipers to undergo compensating pivotal movement relative to the yoke and relative to each other.

Actuator arm 78 functions to move the wipers away from the window glass in opposition to the bias of springs 94. Arm 78 (FIGS. 2, 3, 4, 5) is generally U-shaped in transverse cross section and includes a tang 114 on its lower end which is struck from the sheet metal comprising the lower end of the arm and which passes through guide 56 of quadrant 50 to enable the free end of the tang to slidably guide on the rear face of quadrant 50. A prong 116 is struck from arm 78 at a location above tang 114. Prong 116 also passes through slot 56 for co-action with that slot. The upper end of arm 78 is provided with a cam face 118 and is given a generally U-shaped configuration below the cam face to define a notch 120. Cam face 118 and notch 120 selectively coact with a cam pin 122 mounted between downwardly projecting ears 123 of carrier 76. The side flanges of arm 78 are built up adjacent notch 120 to provide flat skid surface 124 which slidably engages a wear strip 125 of hard plastics material suitably bonded to the adjacent portion of the forward face of bracket 34.

An auxiliary wiper 126, best seen in FIG. 6, is mounted on the top face of carrier 76 immediately below wipers 70 and 72 and generally at the juncture of the inboard ends of wipers 70, 72. Auxiliary wiper 126 includes a bracket portion 128 secured to carrier 76 by bolts 130, a wiper housing 132 secured to the upper end of bracket 128 and a wiper blade 134 slidably mounted in housing 132 for fore and aft movement against the bias of a leaf spring 134. A pin 136 secured to wiper 134 guides in a slot 138 in the overlying portion of housing 132 to limit the extent of fore and aft movement of the blade and allow pivotal movement of the blade relative to housing 132.

Reservoir 80 (FIG. 2) is preferably formed of a plastics material and is mounted within gate 16 in a position rearwardly of the path of the window glass by a bracket 140 and bolts 142. Reservoir 80 is filled with cleaning fluid (for example, water) through a filler pipe assembly comprising a rubber pipe 144 communicating at its inboard end with reservoir 80, a bezel 146 positioned flush in the outer tailgate skin 22, and a flexible elbow 148 interconnecting a fitting on the bezel and the outboard end of pipe 144. A screw cap 150 is threaded into bezel 146 and may be unscrewed (as by inserting a coin in slot 152) to fill the reservoir from the exterior of the vehicle.

Pump assembly 154, best seen in FIG. 7, is secured to the underside of the reservoir. Pump assembly 154 includes a small electric motor 156, a pump casing 158 housing an impeller (not shown) driven by motor 156, an intake elbow 160 extending from the pump casing inlet upwardly through the bottom wall of reservoir 80 for communication with the interior of the reservoir, a conical filter element 162, a nut 164 integral with filter element 162 and coacting with the threaded upper end of elbow 160 and with a collar portion 160a of elbow 160 to clamp pump assembly 154 to the reservoir, and a pump outlet fitting 166 receiving a hose 168. Hose 168 extends to a fitting 170 (FIG. 2) from which two hoses 172, 174 extend for respective connection to the two nozzle assemblies 82, 84.

Each nozzle assembly (FIGS. 2 and 5) comprises a closed ended pipe 176 of generally rectangular cross section. Each pipe 176 includes a plurality of downwardly projecting nozzles 178 and a fitting 180 for connection to a respective hose 172, 174. Pipes 176 are received with a snap fit in U-shaped spring clamps 182 carried on the upper end of brackets 184 suitably secured to an interior panel 186 reinforcing outer skin 22. Panel 186 also mounts a plurality of laterally spaced rubber bumpers 188 which engage wipers 70, 72 as the latter approach their retracted position to realign the wipers in the event they have become skewed about their vertical axes.

It will be understood that suitable controls will be accessible to the driver of the vehicle to selectively actuate the window raising mechanism and the window washing mechanism. The operation of the window washing mechanism of the invention is best understood by reference to FIGS. 4 and 5. In FIG. 5, the window glass is in its raised position and the wipers are retracted from the path of the window glass. If motor 66 is now actuated in a sense to lower the window glass, quadrants 50, 51 are rotated upwardly to lower arms 46, 47 and lower glass 18. During this rotation of the quadrants, prong 116 and tang 114 guide in arcuate slot 56. As the glass approaches its extreme lowered position, the bottom end of slot 56 engages tang 114 to push actuator arm 78 upwardly and move cam surface 118 to a position clear of pin 122 whereupon pin 122 moves into notch 120 under the bias of springs 94 to rotate the wiper blades to their working position in contact with glass 18. During this upward movement of arm 78, skid surface 124 slides on wear strip 125 to facilitate the arm movement. When motor 66 is thereafter actuated in a sense to raise window glass 18, the wipers wipe the glass as the glass moves upwardly. This wiping action, by itself, has some effectiveness and will operate to remove dust and other loose matter from the window. It will not, however, remove encrusted or heavy dirt from the window. To remove such encrusted dirt, pump motor 156 is actuated prior to the actuation of window glass motor 66. This causes jets of water to be squirted out of nozzles 178 onto glass 18 at a location on the glass immediately below wipers 70, 72. If window motor 66 is now actuated, wipers 70, 72 will act to effectively remove the moistened dirt from the window. Auxiliary blade 134 also engages the window during the wiping operation to remove the unwiped streak that would otherwise be left between the inboard ends of wipers 70, 72. If a single upward pass of the window is not effective to remove all of the dirt, this cycle may be repeated until the window is clean. It will also be appreciated that wipers 70 and 72 will be effective to remove dirt from glass 18 when the glass has been wetted by rain or by splashing. As the glass moves upwardly and approaches its extreme up position, the upper end of arcuate slot 56 engages prong 116 to pull actuator arm 78 downwardly with skid surface 124 again coacting with wear plate 125 to facilitate the arm movement. As arm 74 moves downwardly, pin 122 rides up the ramp provided by notch 122 and moves back onto cam surface 118 which thereby acts to maintain the wipers 70, 72 in their retracted position in opposition to the bias of springs 94.

The invention will thus be seen to provide a washer mechanism which is effective to keep the window glass of a tailgate of a station wagon clean and which is effective to remove even heavy and/or encrusted dirt from the window glass, thereby greatly increasing the desirability— and useability—of vehicles of this type.

Although the invention has been illustrated and described with reference to a preferred embodiment, it will be understood that various changes and modifications may be made in the preferred embodiment without departing from the scope or spirit of the invention.

We claim:
1. A tailgate structure for use with a motor vehicle of the multi-purpose or station wagon type comprising:
 (A) a main body gate structure;
 (B) a window glass carried by said gate structure;
 (C) window regulator means carried by said gate structure operative to move said window glass selectively along a predetermined path between a stowed position within said gate structure and a raised position extending upwardly from said gate structure;
 (D) a wiper blade carried within said gate structure;
 (E) means mounting said wiper blade for movement within said gate structure between a working position in which it is disposed adjacent said path and a retracted position in which it is withdrawn from said path; and
 (F) means drivingly connected to said window regulator means and operative in response to operation of said window regulator means to selectively move said wiper blade between its working and retracted positions as said glass is moved along said path whereby said wiper blade may wipe said glass during a portion of the movement of the latter and assume a retracted position with respect to said glass during the remainder of its movement.

2. A tailgate structure according to claim 1 wherein
 (G) said window regulator means includes a regulator member undergoing reciprocal, generally vertical movement in synchronism with the up and down movement of said window glass; and
 (H) said wiper blade moving means includes a generally vertically disposed actuator arm guided adjacent its lower end in a slot in said regulator member and arranged to be moved upwardly by the lower end of said slot as said regulator member approaches the upper end of its upward stroke and moved downwardly by the upper end of said slot as said regulator member approaches the lower end of its downward stroke.

3. A tailgate structure according to claim 2 wherein
 (I) said wiper blade mounting means includes
  (1) a carrier member carrying said wiper blade and mounted for pivotal movement about a generally horizontal, transverse axis and
  (2) spring means continuously biasing said carrier member for rotation in one direction to move said wiper blade toward its working position; and
 (J) the upper end of said actuating arm cammingly engages said carrier member and operates
  (1) in response to the movement thereof in one direction to allow said carrier member to rotate in said one direction under the urging of said spring means to move said wiper blade to its working position and
  (2) in response to the movement thereof in the opposite direction to cammingly rotate said carrier member in the opposite direction against the urging of said spring means to move said wiper blade to its retracted position.

4. A tailgate structure according to claim 3 wherein
 (K) said wiper blade mounting means further includes a yoke mounted generally at its midpoint on said carrier member for pivotal movement about a generally vertical axis and having two arms extending in opposite directions from said midpoint generally transversely of said gate structure; and
 (L) there are two wiper blades as aforesaid, one carried on the free end of each of said yoke arms, and each blade is mounted on the respective arm for pivotal movement about a generally vertical axis.

5. A tailgate structure according to claim 4 and further including
 (M) an auxiliary wiper blade mounted on said carrier member between, and immediately below the inboard ends of, said yoke mounted blades, whereby to wipe the uncleared streak that would otherwise be left between the wiping paths of said yoke mounted blades.

6. A tailgate structure according to claim 3 wherein
 (J) the upper end of said actuator arm defines a cam surface and a notch adjacent said cam surface; and
 (K) said carrier member includes a transverse pin arranged to be engaged by said cam surface to maintain said wiper blade in its retracted position against the bias of said spring means and arranged to drop into said notch in response to vertical movement of said actuating arm to allow said wiper blade to rotate to its working position under the urging of said spring means.

7. A tailgate structure according to claim 1 wherein
 (G) there are two wiper blades as aforesaid; and
 (H) said wiper blade mounting means includes
  (1) a carrier member mounted for pivotal movement about a generally horizontal transverse axis,
  (2) a yoke mounted generally at its midpoint on said carrier member for pivotal movement about a generally vertical axis and having two arms extending in opposite directions from said midpoint,
  (3) means on the free end of each yoke arm mounting a respective wiper blade thereon for pivotal movement about a generally vertical axis, and
  (4) spring means continuously urging said carrier member for rotation in a direction to move said wiper blades to their working position.

8. A tailgate structure according to claim 7 wherein
 (I) said window glass moving means comprises a window regulator mechanism including a regulator member undergoing reciprocal, generally vertical movement in synchronism with the up and down movement of said window glass, and (J) said wiper blade moving means includes a generally vertically disposed actuator arm
  (1) guiding adjacent its lower end in a slot in said regulator member and arranged to be moved upwardly by the lower end of said slot as the regulator member approaches the upper end of its upward stroke and moved downwardly by the upper end of said slot as said regulator member approaches the lower end of its downward strokes, and
  (2) engaging said carrier member adjacent its upper end and operating in response to movement thereof in one direction to move said wiper blades to their retracted position against the bias of said spring means and in response to movement thereof in the opposite direction to allow said wiper blades to be moved to their working position under the urging of said spring means.

References Cited

UNITED STATES PATENTS

| | | | |
|---|---|---|---|
| 1,924,922 | 8/1933 | Gehrig | 15—250.1 |
| 2,651,800 | 9/1953 | Picon | 15—250.42 |
| 2,743,472 | 5/1956 | Alef | 15—250.1 |
| 3,088,153 | 5/1963 | Lystad | 15—250.02 |
| 3,112,510 | 12/1963 | Forbush et al. | 15—250.01 |
| 3,452,384 | 7/1969 | Scinta | 15—250.1 |

FOREIGN PATENTS

| | | | |
|---|---|---|---|
| 1,190,823 | 4/1965 | Germany | 15—250.01 |

ROBERT W. JENKINS, Primary Examiner

U.S. Cl. X.R.

15—250.01